Figure 1:
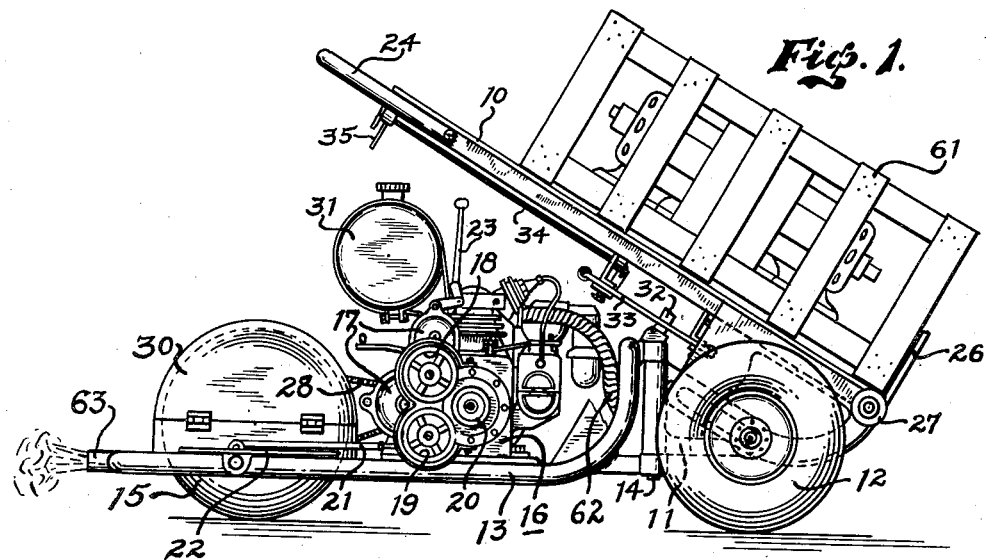

June 5, 1945.　　　　　J. L. WATERS　　　　　2,377,389
MOTORIZED HAND TRUCK
Filed Dec. 7, 1943　　　　　3 Sheets-Sheet 1

INVENTOR.
JOHN L. WATERS.
BY
W. H. Atkinson
ATTORNEY

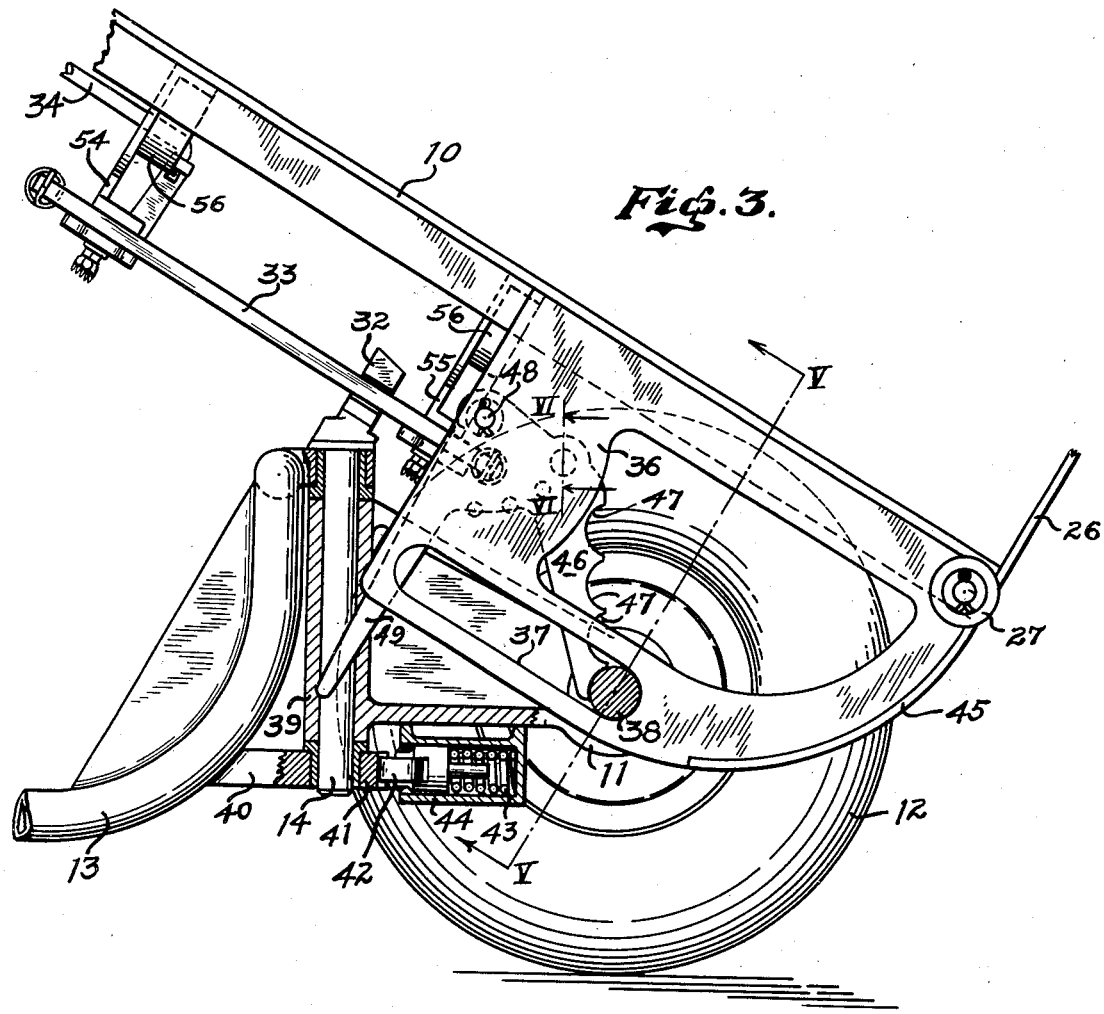
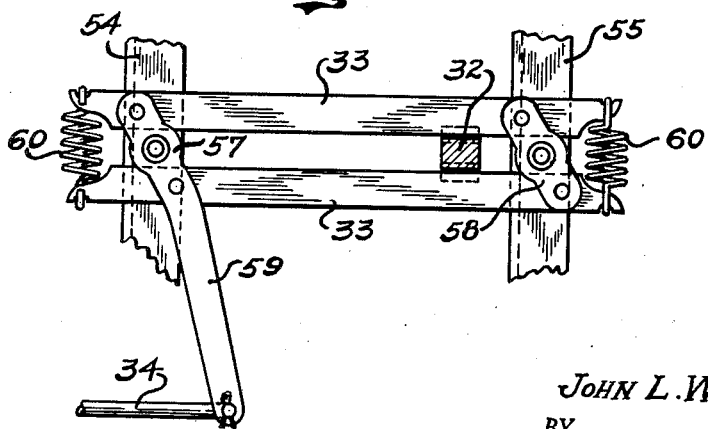

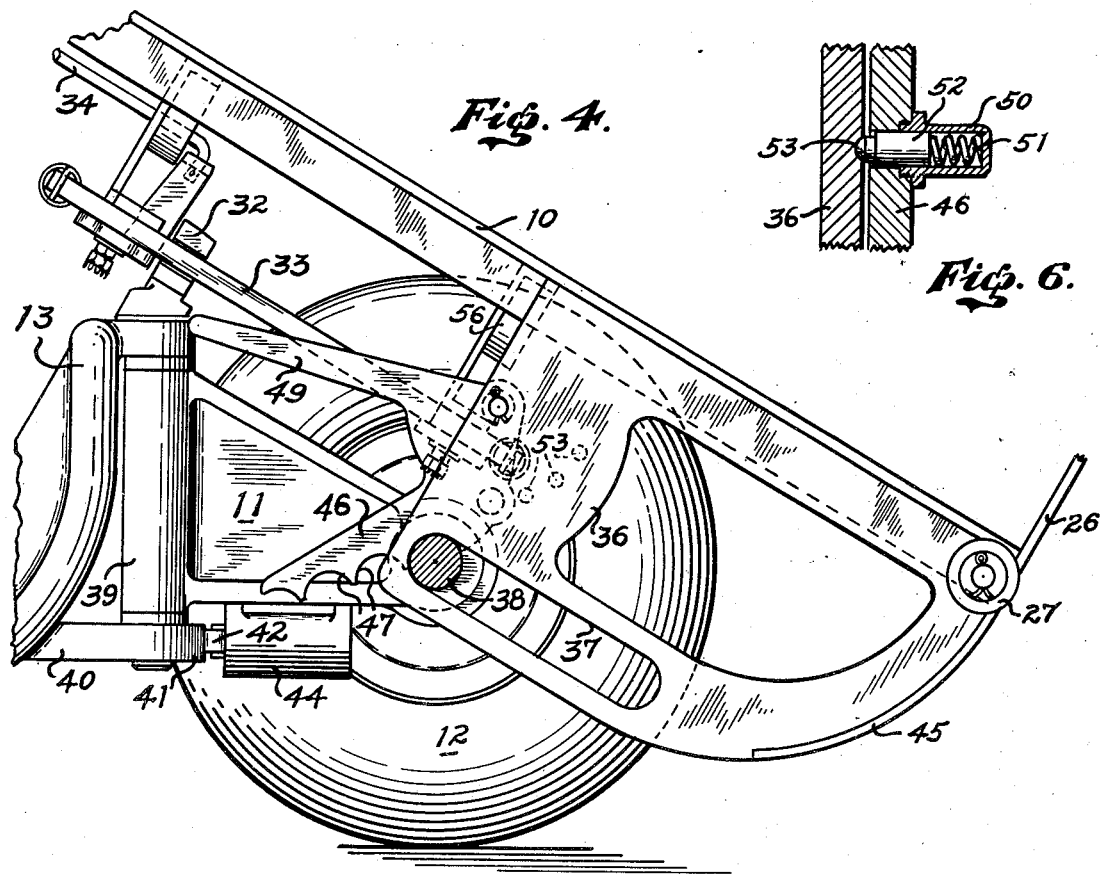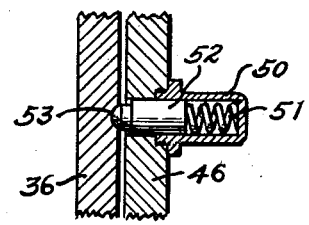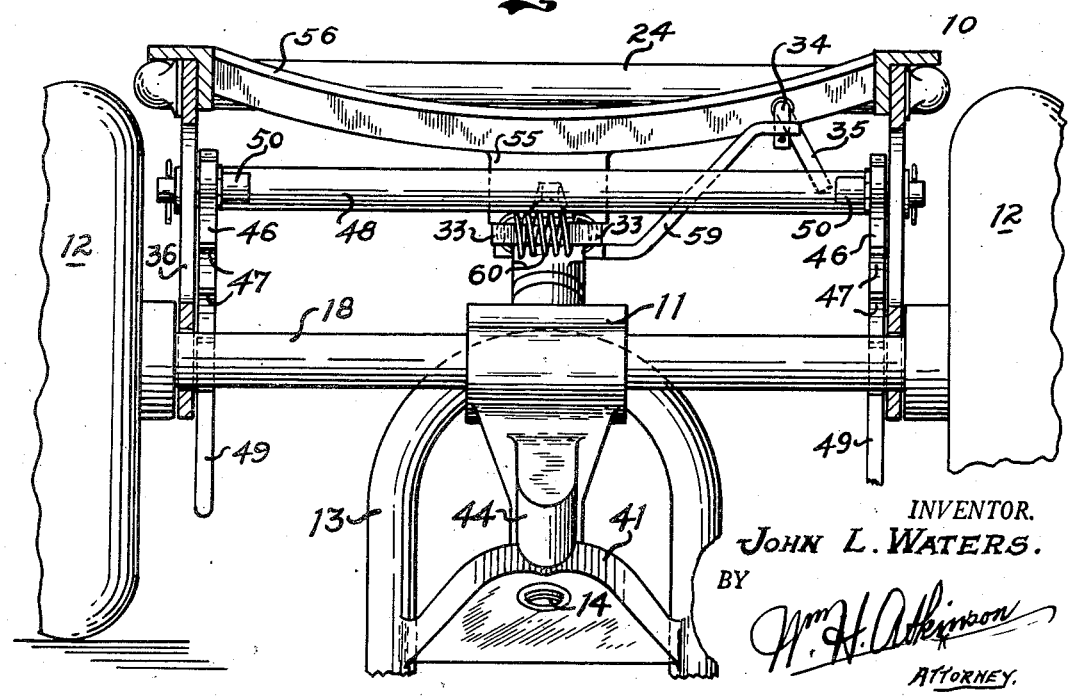

Patented June 5, 1945

2,377,389

UNITED STATES PATENT OFFICE 2,377,389

MOTORIZED HAND TRUCK

John Landon Waters, Salem, Oreg., assignor to Salem Steel & Supply Company, Salem, Oreg., a copartnership Application December 7, 1943, Serial No. 513,309

13 Claims. (Cl. 214—65)

My invention relates to an improved industrial truck which may be either of the hand or motor propelled type, and more specifically, in some of its aspects, the invention relates to improvements that will be found particularly adapted to motor propelled hand trucks, such as are used in transporting baggage, boxes, barrels, etc., for short distances.

An object of the invention is to provide a new and novel form of industrial truck, such as may be used for the transportation of boxes, barrels and like articles, and which is simple in construction, practical in operation and inexpensive to manufacture.

Another object of the invention is to provide an industrial truck of the so-called tiltable type in which the truck may be first brought into engagement with a load and then tilted into a load balancing position upon its supporting wheels in a new and novel manner.

Another object of the invention is to provide an industrial truck of the tiltable type in which the fulcrum point of the load upon the truck axle may be varied in a novel manner to effect a balancing of the load over the truck axle.

Another object of the invention is to provide an articulated industrial truck of novel design in which a forward load supporting portion is pivotally attached to a trailing third wheel portion and in which a steering of the truck is accomplished by a swinging of the load carrying portion thereof with respect to the trailing portion of the truck.

A more general object of the invention is to provide an inexpensive industrial truck of the scooter-type in which an articulated chassis, having a forward steerable portion upon which a load is supported by two transversely spaced wheels, is centrally connected to a trailing portion having a single driving and/or supporting wheel, upon which a power unit is mounted and wherein the control of the power unit is effected through an operator supporting foot platform while the operator riding thereupon may steer the truck by a swinging of the load and the forward steerable portion with respect to the trailing portion of the chassis.

Other objects and advantages of the invention will be evident to those skilled in the art and in part pointed out hereinafter in connection with the following description taken in connection with the accompanying drawings, wherein there is shown by way of illustration and not of limitation preferred embodiments thereof.

Figure 2:
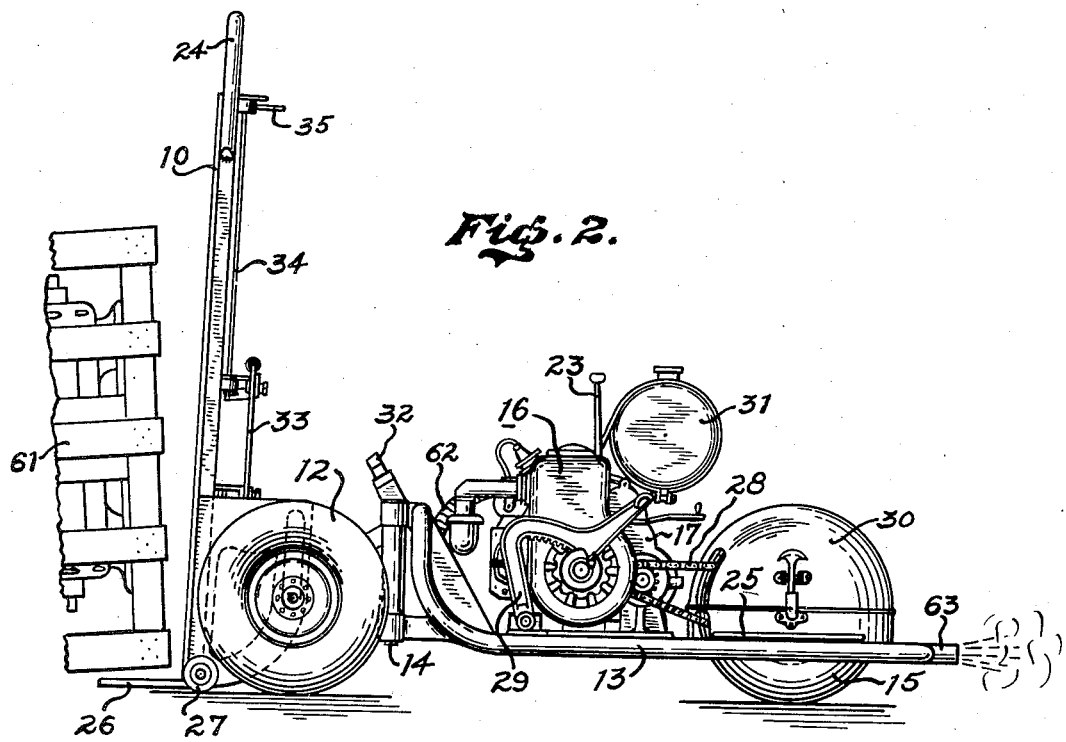

In the drawings:

Figure 1 is a side elevation of a power propelled industrial truck embodying the improvements contemplated by my invention, Figure 2 is a view similar to Figure 1 showing the reverse side of the truck and with its load carrying frame tilted forward, Figure 3 is a fragmentary side elevation of my improved truck, partially in section, and showing details of the invention with the load carrying frame in a retracted position, Figure 4 is a view similar to Figure 3 showing the truck with its load carrying frame in an extended position, Figure 5 is a fragmentary, sectional view taken along line V—V of Figure 3 looking in direction of arrows, Figure 6 is a partial, fragmentary sectional view taken along line VI—VI of Figure 3, and Figure 7 is a fragmentary bottom view showing details of preferred form of latching mechanism, as contemplated by the invention.

As will be clearly seen from Figures 1 and 2 of the drawings, my invention, in its preferred form, comprises a substantially conventional type of tiltable load carrying frame 10 which is carried by an articulated chassis that has a forward steerable portion 11 which is supported upon two transversely disposed wheels 12, as will be hereinafter described, and to complete the chassis, there is a trailing or chassis-like frame 13 that is pivotally connected to the forward steerable portion 11 by means of a substantially vertical spindle 14. At its trailing end the chassis-like frame 13 has a supporting and driving wheel 15 and in this arrangement it also carries an internal combustion engine or power producing unit, designated in its entirety by the numeral 16. Associated with the power unit 16 there is also a novel form of power take-off or drive controlling clutch which, for the purpose of this disclosure, may be described as comprising a housing 17 having a plurality of extending and oppositely geared friction wheels 18 and 19 that can be rocked to bring either one or the other of the friction wheels into contact with a rotating wheel or cylinder 20 which is adapted to be continuously driven in a uni-directional manner by the internal combustion engine or power unit 16. In this arrangement the power take-off or controlling clutch housing 17 is shown as adapted to be rocked to bring the friction wheels 18 and 19 into and out of cooperating relation with the rotating wheel or cylinder 20 of the internal combustion engine. This rocking of the clutch housing 17 is accomplished by means of a link 21 that is operated by a tiltable foot platform 22 upon which an operator may ride. As an additional means for controlling the clutch housing 17, there is also provided a convenient manually operable lever 23 that extends upwardly to a point adjacent the upper end of the frame 10. At this point it should be stated that the particular power take-off or reversible clutch arrangement, briefly described above and shown in Figures 1 and 2 of the drawings in this case, is to constitute the subject matter of a separate application now in preparation. As here shown, the load supporting frame 10, when loaded, is adapted to extend rearwardly over the power producing unit 16, and at its upper end it is provided with a suitable handle bar 24 which may be conveniently grasped and held by an operator standing upon the tiltable foot platform 22 which is associated with a corresponding, but stationary, foot platform 25 at the other side of the driving wheel 15 of the chassis-like frame 13.

As is more clearly shown in Figure 2 of the drawings, the tiltable load carrying frame 10 is adapted to be tilted forwardly so as to bring a conventional load retaining lip 26, located at its forward end, into a substantially horizontal position where it may be positioned under the near side of a load in the usual manner. In this latter figure of the drawings it will also be noted that when the load carrying frame 10 is tilted forwardly in this manner, it is adapted to be supported out of interfering engagement with the ground by means of two oppositely disposed roller-like members 27 that will serve to support the weight of the frame 10 as it is moved forward beneath the load. This latter figure of the drawings also more clearly shows the driving wheel 15 as connected to the power take-off or controlling clutch housing 17 by means of a driving chain 28. In this view the internal combustion engine or power unit 16 is also illustrated as having a conventional type of kick starting lever 29, by means of which the internal combustion engine 16 may be conveniently started. In order to protect the operator against accidental contact with the driving wheel 15, this wheel is covered by a guard or enclosing housing 30 which is also carried by the chassis-like frame 13. A tank 31 containing fuel for the internal combustion engine 16 is also conveniently mounted upon the engine block. As will be pointed out hereinafter in more detail, the upper end of the substantially vertical spindle 14 carries a latch engageable extension or tongue 32 with which a pair of oppositely arranged latching bars 33, located along the lower side of the load carrying frame 10, are adapted to cooperate. This latching bar and tongue arrangement is to latch or lock the load carrying frame 10 in its reclined or load carrying position upon the chassis when the truck is in operation, and it is controlled by an operating rod 34 which terminates at a convenient point 35 closely adjacent the handle bar extension 24 at the upper end of the load carrying frame 10.

Upon now referring to Figures 3, 4 and 5 of the drawings, it will be noted that the load carrying frame 10 is provided with downwardly depending side portions 36 each of which have an elongated slot 37 through which a transversely extending axle 38, which carries the wheels 12, extends. This transversely extending axle 38, as here shown, is secured intermediate its ends upon the hereinbefore described forwardly extending steerable portion 11 of the truck chassis. The chassis-like frame 13, as is also here more clearly illustrated, is journaled at the upper and lower ends of the vertically disposed spindle 14 that is carried by a spindle engaging portion 39 of the forwardly extending steerable portion 11. In this view it will also be noted that the upwardly extending latch engageable extension 32 is carried by the upper end of the spindle 14 and when so provided, it will be understood that the spindle 14 will preferably be secured against rotation within the spindle engaging portion 39 of the forward steerable portion 11 so that this extension 32 will remain in alignment with the latching bars 33 which extend longitudinally of the load carrying frame 10. As a means for normally centering the load carrying wheels 12 in straight-line relation with the trailing or driving wheel 15, the chassis-like frame 13 is provided with a lower spindle engaging bracket 40 which has a fan or cam-like forward surface or extremity 41 over which a spring pressed roller 42 is adapted to ride. In this arrangement the spring pressed roller 42 is held in engagement with the fan or cam-like surface 41 by means of a compression spring 43 that is mounted in a housing 44 secured along the bottom surface of the forward steerable portion 11 of the truck. In this manner, when the load carrying frame 10 is in its retracted or load carrying position, as shown in the drawings, the normal tendency of the forward steerable portion 11 will be to maintain a straight-line relationship with the longitudinal axis of the chassis and, therefore, it is contemplated that the configuration of the fan or cam-like forward surface of the extremity 41 will be such as to tend to return its surface engaging roller 42 to its central position as shown. This same result might also be obtained by slightly inclining the spindle 14 so as to produce a caster-like action. By now again referring to the load carrying frame 10 it will be noted that in addition to having the transverse axle engaging slots 37, these downwardly depending side portions 36 also have their outer or forward ends rounded off so as to provide a rocker-like surface 45 at the forward end of the truck frame. This rocker-like surface 45 terminates at its outer end in line with the load retaining lip 26. At this point it will also be noted that the rollers 27 at the outer end of the load carrying frame 10 extend slightly beyond the rocker-like surface 45 so that, as illustrated in Figure 2 of the drawings, they will engage the ground and support the weight of the load carrying frame 10 independently of the transversely disposed wheel carrying axle 38 as the frame 10 is being moved into engagement with a load. In order to retain the transversely disposed wheel carrying axle 38 in an operative position within the slots 37 of the depending side portions 36, the invention also contemplates the provision of pivotally mounted and manually movable members 46, each of which has an arcuate portion with a series of axle engaging notches or fulcrum points 47 that are adapted to be engaged by the axle 38 and cooperate with the slots 37 so as to hold the transverse axle 38 at any one of a number of different points at or between its limits of travel and about which the load carrying frame 10 may be tilted. These members 46, as is more clearly shown in Figure 5 of the drawings, are mounted upon a transversely extending rod or shaft 48 which is mounted between and at the rear of the depending side portions 36. For the purpose of controlling the movements of these members 46, they are each provided with an operating handle 49 which extends outwardly to a convenient position where they may be grasped by an operator. As a further feature, each of the members 46 is also provided with a cup-like housing 50 in each of which, as is more clearly shown in Figure 6 of the drawings, there is mounted a compression spring 51 and a plunger 52 that extend through the members 46 so that their ends will be brought into register with any one of a number of cooperating recesses 53 formed upon the inside surface of the depending side portions 36 of the truck frame. With this arrangement, when the load carrying frame 10 is secured in its rearmost position with respect to the transverse axle 38, the members 46 will be held so that the notches or fulcrum points 47 at the extreme ends thereof will engage the axle 38 and thus operate to retain the load carrying frame 10 upon the axle 38 in the position shown in Figure 3 of the drawings, and when the members 46 are moved into their other extreme position, the innermost notches or fulcrum points 47 of the members 46 will engage the transverse axle 38 and operate to retain the load carrying frame 10 in the position as shown in Figure 4 of the drawings. It will also be understood that, when constructed as illustrated, the members 46 may be positioned at two other points where they will operate to hold the transverse axle 38 in at least two intermediate points between its limits of travel within the slots 37 of the depending side portions 36. In this connection it will also be seen that the latching arrangement provided by the hereinbefore described latching tongue 32 and the latching bars 33 will be operative to secure the load carrying frame 10 against any forward tilting movement at any one of the points at which it may be positioned by the members 46.

As is more clearly shown in Figure 7 of the drawings, the latching bars 33 are supported below downwardly extending and flanged brackets 54 and 55 which are carried by bowed cross members 56 that extend between the side portions of the load carrying frame 10. These latching bars 33 are of similar construction and are mounted in right and left hand relation to each other upon yokes 57 and 58 which are pivotally secured at their centers upon the flanged brackets 54 and 55. The yoke 57, as here shown, differs from the yoke 58 in that it has an outwardly extending lever arm 59 with which the end of the operating rod 34, previously described, connects. At the ends of the latching bars 33 there are two similar tension springs 60 which operate to bias these bars toward each other and into latching engagement with the extension or latching tongue 32 at the upper end of the spindle 14.

When the truck, constructed as above, is in use with a load, designated by the numeral 61, thereupon it will be seen that an operator standing upon the foot platforms 22 and 25 and astride the rear driving wheel 15, may by rocking the foot platform 22 cause the clutch housing 17 to be rocked upon its support to bring either of the friction wheels 18 or 19 into contact with the rotating wheel or cylinder 20 of the internal combustion engine 16 and thus produce, as desired, either a forward or reverse movement of the truck as a whole. At the same time, by grasping the handle bar 24, the operator will be able to steer the truck in any desired direction by merely swinging the load carrying frame 10 with the load 61 thereupon in either direction with respect to the trailing portion of the chassis. In approaching a load the operator will first release the latching bars 33 by pulling upon the rod 34, after which he can then tilt the truck forward into the position as shown in Figure 2 of the drawings. At this point the load carrying frame 10 will be supported by the rollers 27 at the forward end thereof and then, by either manually pushing the truck or operating the hand lever 23, he will be able to move the truck as a whole and bring the load carrying frame 10 into engaging relation with the load 61. After the load 61 has been postioned upon the load retaining lip 26, as is well understood, the operator can, by pulling rearwardly upon the handle bar 24, cause the load carrying frame 10, with its load, to rock rearwardly upon the rocker-like surface 45 until the transverse axle 38 is brought into engagement with one or the other of the notches or fulcrum points 47 carried by the members 46. Then, by a further rearward tilting of the load carrying frame 10, the operator will be able to lift the load 61 out of engagement with the ground and latch the load carrying frame 10 in its reclined or load carrying position, as shown in Figure 1 of the drawings. During or prior to this loading operation, it will be understood that the operator will be free to adjust the members 46 so as to retain the transverse axle 38 in substantially a load balancing position within the longitudinal slots 37 of the side portions 36. After reaching a load discharging location, the operator can then unload the truck by carrying out the above operations in reverse order. At this point, and in order to further explain Figures 1 and 2 of the drawings, it may be said that the internal combustion engine 16 is provided with a flexible exhaust conduit 62 that communicates with the interior of one side of the chassis-like frame 13 which is here shown as constructed of tubular material with an exhaust discharge outlet 63 at its rear end.

While I have, for the sake of clearness and in order to disclose the invention so that the same can be readily understood, described and illustrated specific devices and arrangements, I desire to have it understood that this invention is not necessarily limited to the specific means disclosed, but may be embodied in other ways that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is:

1. In a truck of the character described, the combination of a transversely disposed axle having supporting wheels mounted at the ends thereof, a tiltable load supporting frame mounted to slide longitudinally over said axle between the wheels at the ends thereof, fulcrum forming means for holding said load supporting frame against longitudinal movement over said axle adapted and arranged to provide a fulcrum point for said tiltable load supporting frame at a plurality of locations between its limits of longitudinal movement over said axle, and means carried by said load carrying frame adapted to cooperate with said fulcrum forming means and retain said tiltable load supporting frame in any one of a number of load balancing positions upon said axle.

2. In a truck of the character described, the combination of a chassis having a forward portion with a transverse axle and supporting wheels mounted at the ends thereof, a tiltable load supporting frame mounted to slide longitudinally over said axle between the wheels at the ends thereof, means carried by said load supporting frame for holding it against longitudinal movement over said axle adapted and arranged to provide a fulcrum for said tiltable load carrying frame at various locations between its limits of slidable movement, and means carried by said chassis and said tiltable load carrying frame adapted to cooperate with said fulcrum providing means and retain said frame in a load balancing position upon said axle in any one of the locations in which said frame is held by said fulcrum providing means.

3. In a truck of the character described, the combination of an articulated chassis having a forwardly disposed steerable portion with a transverse axle having supporting wheels mounted at the ends thereof, a tiltable load supporting frame mounted upon said axle for both a tiltable and longitudinal movement with respect thereto, means for limiting the longitudinal movement of said load supporting frame adapted and arranged to provide pivotal points about which said frame may be tilted at various locations between its limits of longitudinal movement, and means carried by said chassis and said tiltable load carrying frame adapted to cooperate with said last means and retain said load supporting frame in a load balancing position upon said axle when in any one of a number of different locations between its limits of longitudinal movement.

4. In a hand truck of the character described, the combination of a scooter-like chassis having a forwardly disposed steerable extension pivotally secured thereto, a transversely disposed axle having surface engaging wheels at its ends for supporting the steerable extension of said chassis, a load supporting frame tiltably and slidably mounted upon said axle, whereby said frame may be tilted forward to engage and pick up a load and later returned to a load balancing position upon said axle, and a latching means for holding said load supporting frame in any one of a number of load balancing positions over said transversely disposed axle while permitting a steering of said chassis by a swinging of said load supporting frame.

5. In a hand truck of the character described, the combination of a scooter-like chassis having a forwardly disposed steerable extension pivotally secured thereto, a transversely disposed axle having surface engaging wheels at its ends for supporting the steerable extension of said chassis, a load supporting frame pivotally mounted upon said axle, whereby said frame may be tilted forward to engage and pick up a load and returned to a load balancing position, means whereby the pivotal point of said load supporting frame upon said axle may be varied in a longitudinal direction to effect a balancing of a load upon said axle, and a latching means having co-operating parts carried by said forwardly disposed steerable extension and said load supporting frame for holding said frame in a load carrying position at any one of its pivotal points upon said axle.

6. In a truck of the character described, the combination of a frame member having a transversely extending axle with supporting wheels at the ends thereof and a substantially vertically disposed spindle located rearwardly of said axle, a chassis-like frame pivotally attached to the spindle of said frame member, a power driving unit mounted upon said chassis-like frame, a single driving wheel disposed centrally of said chassis-like frame and in trailing relation with the supporting wheels of said frame member, a foot platform upon said chassis-like frame at each side of said driving wheel for supporting the weight of an operator, a reversible power transmitting clutch mechanism providing a controllable driving connection between said driving wheel and said power driving unit, and means whereby said clutch mechanism may be operated by a rocking of one of said foot platforms to connect said power driving unit to said driving wheel for a forward or reverse movement of the truck depending upon the direction in which said foot platform is rocked.

7. In a truck of the character described, the combination of a frame member having a transversely extending axle with ground engaging wheels at the ends thereof, a chassis-like frame pivotally attached in trailing relation to said frame member, a power producing unit mounted upon said chassis-like frame, a single driving wheel disposed centrally behind the wheels upon the axle of said frame member and supporting the trailing end of said chassis, a reversible power transmitting clutch mechanism for establishing a driving connection between said power producing unit and said driving wheel, and a foot platform at each side of said driving wheel having an operating connection with said clutch mechanism, whereby said clutch mechanism may be operated by a rocking of one of said foot platforms to connect said power driving unit to said driving wheel.

8. In a hand truck for transporting barrels, boxes and like articles, the combination of an articulated chassis having a forward steerable portion and a rearward trailing portion, said portions being connected together by a substantially vertical spindle, a transversely extending axle having wheels at its ends for supporting said forward steerable portion and a single supporting wheel at the outer end of said rearward trailing portion, a load supporting frame tiltably mounted upon said transversely extending axle so that it may be tilted forwardly to engage a load and returned to a reclining position to bring a load thereupon into supported relation with said axle, and means for securing said load supporting frame in its load carrying position, whereby the truck may be steered in any desired direction by a swinging of the load supporting frame with respect to the trailing end of said chassis.

9. In a hand truck for transporting barrels, boxes and like articles, the combination of an articulated chassis having a forward steerable portion and a rearward trailing portion said portions being connected together by a substantially vertical spindle, a transversely extending axle having wheels at its ends for supporting said forward steerable portion, a single supporting wheel at the rear end of said trailing portion, a load supporting frame tiltably mounted upon said transversely extending axle so that it may be tilted forwardly to engage a load and returned to a load carrying position over said axle, said load supporting frame being also slidable transversely of said axle to permit a balancing of a load over said axle, and means for securing said load supporting frame in any one of its reclined and transverse positions upon said axle, whereby said load supporting frame will be secured against tilting while the truck is steered in any desired direction by a swinging of the load supporting frame with respect to the trailing end of said chassis.

10. In a hand truck for transporting barrels, boxes and like articles, the combination of an articulated chassis having a forward steerable portion and a rearward trailing portion, said portions being connected together by a substantially vertical spindle, a transversely extending axle having supporting wheels at its ends for supporting said forward steerable portion, a single supporting wheel at the rear end of said trailing portion, a load supporting frame tiltably mounted upon said transversely extending axle so that it may be tilted forwardly to engage a load and returned to a reclining position to bring a load thereupon into supported relation upon said axle, means for securing said load supporting frame in a load carrying position, whereby the truck may be steered in any desired direction by a swinging of the load supporting frame with respect to the trailing end of said chassis, and means cooperating with said spindle tending to bias said forward steerable portion and said trailing portion into straight-lined relationship with respect to each other.

11. In a hand truck of the character described, the combination of a transversely disposed axle having supporting wheels at the ends thereof, a load supporting frame having downwardly depending sides adapted to slidably engage said axle, said load supporting frame having a load retaining lip at its end and said downwardly depending sides providing a rocker-like surface as a continuation of said load retaining lip, whereby said load supporting frame may be tilted and rocked free of said axle and with a load thereupon while permitting a free longitudinal movement of said axle with respect thereto, and means adapted to limiting the longitudinal movement of said load supporting frame in any one of a number of different positions between its limits of travel, whereby said axle will be held in a load balancing position with respect to said load supporting frame after the rocker forming portions thereof are tilted out of contact with the ground.

12. In a hand truck of the character described, the combination of a transversely disposed axle having supporting wheels at the ends thereof, a load supporting frame having downwardly depending sides adapted to slidably engage said axle adjacent each of said wheels, said load supporting frame having a load retaining lip at its end and said downwardly depending sides having a rocker-like configuration at their outer ends as a continuation of said load retaining lip, whereby said load supporting frame may be rocked with a load thereupon while permitting a free longitudinal movement of said axle with respect thereto, and means for retaining said load supporting frame in any one of a number of different positions between its limits of slidable movement upon said axle, whereby said axle will be held in a load balancing position with respect to said load supporting frame and permit the rocker-like depending sides of said frame to be tilted out of contact with the ground.

13. In a hand truck of the character described, the combination of a transversely disposed axle having supporting wheels at the ends thereof, a tiltable load supporting frame having slotted downwardly depending sides adapted to slidably engage said axle adjacent each of said wheels adapted and arranged to permit said load supporting frame to move independently of said axle when said frame is tilted to a vertical position, rocker forming means at the outer ends of said downwardly depending sides adapted to engage the ground and upon which said load supporting frame may be rocked independently of said axle, and roller means at one end of said rocker forming means for supporting said load supporting frame in a vertical position independently of said axle when said frame is being moved into engagement with a load.

JOHN LANDON WATERS.